United States Patent
Reiss

(10) Patent No.: US 9,663,667 B2
(45) Date of Patent: May 30, 2017

(54) ELECTROLESS SILVERING INK

(71) Applicant: Andre Reiss, Jamaica, NY (US)

(72) Inventor: Andre Reiss, Jamaica, NY (US)

(*) Notice: Subject to any disclaimer, the term of this patent is extended or adjusted under 35 U.S.C. 154(b) by 97 days.

(21) Appl. No.: 13/694,943

(22) Filed: Jan. 22, 2013

(65) Prior Publication Data

US 2014/0205859 A1    Jul. 24, 2014

(51) Int. Cl.
*C23C 18/31* (2006.01)
*C23C 18/54* (2006.01)
*C09D 11/00* (2014.01)
*B32B 15/01* (2006.01)

(52) U.S. Cl.
CPC .............. *C09D 11/00* (2013.01); *B32B 15/01* (2013.01); *C23C 18/31* (2013.01); *C23C 18/54* (2013.01); *Y10T 428/12882* (2015.01)

(58) Field of Classification Search
CPC .......... C23C 18/31; C23C 18/54; C09D 11/00
USPC ........................................................ 106/1.23
See application file for complete search history.

(56) References Cited

U.S. PATENT DOCUMENTS

| | | | | |
|---|---|---|---|---|
| 2,602,757 | A * | 7/1952 | Kantrowitz et al. | 106/1.26 |
| 3,294,578 | A * | 12/1966 | Popeck | 106/1.26 |
| 3,635,761 | A * | 1/1972 | Haag et al. | 106/1.23 |
| 3,830,650 | A * | 8/1974 | Henriksen | 106/1.18 |
| 3,963,841 | A | 6/1976 | Anschel et al. | |
| 4,009,297 | A * | 2/1977 | Redmond et al. | 427/558 |
| 4,197,275 | A | 4/1980 | Parker | |
| 4,908,241 | A * | 3/1990 | Quast et al. | 427/437 |
| 4,975,305 | A | 12/1990 | Biginelli | |
| 5,322,553 | A | 6/1994 | Mandich et al. | |
| 5,514,261 | A | 5/1996 | Herklotz et al. | |
| 5,935,640 | A * | 8/1999 | Ferrier et al. | 228/209 |
| 6,045,725 | A * | 4/2000 | Udaka et al. | 252/586 |
| 6,291,025 | B1 * | 9/2001 | Tepper et al. | 427/96.6 |
| 6,387,542 | B1 | 5/2002 | Kozlov et al. | |
| 6,860,925 | B2 * | 3/2005 | Soutar et al. | 106/1.23 |
| 6,869,637 | B2 | 3/2005 | Hutchinson et al. | |
| 8,298,325 | B2 | 10/2012 | Norkus et al. | |
| 2007/0261595 | A1 * | 11/2007 | Johnson et al. | 106/31.13 |

* cited by examiner

*Primary Examiner* — Helene Klemanski

(57) ABSTRACT

An electroless waterless silver plating ink process for coating an article substrate with a bright metallic silver plate, wherein the silvering ink comprises a silver salt, an ammonium salt and dimethyl sulfoxide.

3 Claims, No Drawings

ELECTROLESS SILVERING INK

TECHNICAL FIELD

This application for Letters Patent relates to a plating technique, and particularly relates to electroless, autocatalytic, charge exchange, and substitutional plating.

This application is petitioned to make special under 37 CFR 1.102(c)(1).

BACKGROUND OF THE INVENTION

In electroless plating of copper with silver, a copper metal is immersed in a water solution of silver cyanide. Immersion of the copper metal coats the red copper surface with a bright silver plate. The cyanide bath is prepared by salting silver nitrate in water to precipitate silver chloride. A cyanide salt is then added to dissolve the precipitated silver chloride into a silver cyanide complex which is soluble in water.

This process of plating is also known as autocatalytic, charge exchange, and substitutional plating. Electroless plating does not require battery power to drive metal deposition. Electroplating does require the complication of an added battery.

Aqueous silver plating solutions, even with cyanide addition, are unstable. In time, the solutions darken from exposure to light and airborne dust. Also, because water is a protic solvent, hydrogen is formed as a byproduct of the plating reaction to dull and crack the brightness of the silver plate.

Bonding of a silver film to a base copper wire by aqueous cyanide plating is also subject to cracking and rusting, commonly called "the red plague." The plague is caused by hydrogen, copper and silver reacting with water to form red and black spots during the electroless plating process.

Now, that local and federal environmental laws have restricted use of silver cyanide, there is an even greater need for an improved cyanide free substitute.

Examples of aqueous electroless plating include:
(a) U.S. Pat. No. 5,322,553 in which the plating process is one step, comprising immersing nickel metal in:
hot water as the solvent;
silver sulfite and silver thiosulfate as both the supplier of the silver salt and reducer of the silver salt to a bright metal;
sodium EDTA as the silver complexing agent.
(b) U.S. Pat. No. 6,387,542 in which the plating process is one step, comprising immersing metal and non-metal substrates in:
boiling water as the solvent;
silver nitrate as the silver salt;
ammonia as the silver complexing agent;
hydrazine as the reducer of the silver salt to a bright metal.
(c) U.S. Pat. No. 6,387,542 revealing electroless bright silver deposition on a steel substrate in a multiple step process with an aqueous solution including a silver salt, an ammonium salt to complex the silver salt, and a hydrazine salt to reduce the silver salt to a bright metal.

An example of a waterless electroless plating method includes:
(d) U.S. Pat. No. 8,298,325 revealing electroless copper deposition on a non-metallic substrate sensitized with two non-aqueous solutions comprising copper and cobalt and an ammonium salt complexing component. A second electroplating step is not required to form the bright metal plate, but the reduction of the copper salt to a bright copper plate is a multiple step process.

An example of waterless electroless plating using a polar aprotic solvent includes:
(e) U.S. Pat. No. 3,963,841 revealing electroless metal deposition on a non-metallic substrate sensitized with a non-aqueous palladium salt in dimethyl sulfoxide as a first step. A second aqueous electroplating step is required to form a bright silver plate.

Examples of silver diammine complexes include:
(f) U.S. Pat. No. 4,197,275 reveals recovery of silver bromide from waste photographic film with ammonium bromide dissolved in non-aqueous dimethyl sulfoxide without claiming the process as a plating aid.
(g) U.S. Pat. No. 5,514,261 reveals a silver diammine complexing ion for cyanide free aqueous electroplating of silver in a multiple step process.

Electroplating pens are common in the jewelry industry for coating yellow gold with a bright rhodium plate. These pens require the complication of a battery. Petitioner is aware of a need for an electroless ink useful for one step silver plating at room temperature by a pen means.

OBJECTIVES OF THE INVENTION

An object of the invention is to provide a silvering ink for one step coating of a base metal, preferably copper, with bright silver.

A further object of the invention is to provide a silver plated article using a silvering ink.

A further object of the invention is to provide a silvering ink that does not need battery power to plate a base metal with silver.

A further object of the invention is to provide a silvering ink that is fluid, stable, cyanide free, and relatively non-toxic.

A further object of the invention is to provide a silvering ink that is amenable to use by immersion and spray plating means.

A further object of the invention is to provide a silvering ink that is amenable to use by pen nib means at room temperature.

Other objects, aspects and advantages of the invention will become apparent to those skilled in the art upon reviewing the following detailed description.

SUMMARY OF THE INVENTION

Specifically, the presented invention is a silver plating ink useful in a one step process for plating an article substrate with bright metallic silver.

Petitioner has surprisingly discovered that a non-aqueous ammonium complex of silver bromide dissolved in dimethyl sulfoxide is a viable ink for coating a copper substrate with a bright silver plate. A polar silver diammine ion, $[Ag(NH_3)_2]^+$, is likely the complex produced in situ by reacting dry silver nitrate and dry ammonium bromide in dimethyl sulfoxide. Immersion of copper in such ink solution results in a one step process for coating red copper with bright silver. The ink solution is stable in storage for over six months despite exposure to air and light.

Petitioner has also found that the waterless solution can be loaded in a marking pen as an ink. Application of the ink to the metal through a pen nib, writes a bright silver metal on a red copper surface.

DETAILS OF THE INVENTION

Water is both a protic and polar solvent. Water is protic in that it contains hydrogen protons. Water is polar in that the hydrogen is ionic. Unfortunately, the charged hydrogen ions in water destabilize metal plating solutions.

An aprotic substance is defined as a polar solvent without a protic hydrogen ion as present in water. Polar aprotic solvents such as dimethyl sulfoxide can dissolve polar solids. Petitioner has discovered that replacing water with a polar aprotic solvent allows an ink useful in a one step electroless process for plating an article with a bright metallic silver coat.

Petitioner believes that combination of dry silver nitrate and dry ammonium bromide within waterless dimethyl sulfoxide forms a polar diammine complex of silver bromide, $Ag(NH_3)_2Br$, which dissolves into the diammine ion of silver, $[Ag(NH_3)_2]^+$. The parent silver salt to make the diammine ion includes the class of silver compounds soluble in dimethyl sulfoxide. Silver nitrate and silver acetate are preferable, but not limiting.

To complex a parent silver salt into a silver diammine ion, an ammonium halide salt that is soluble in dimethyl sulfoxide is required. Ammonium bromide is preferred over ammonium chloride as it has been found to be more stable in solution and give a brighter and thicker silver coat.

Other than dimethyl sulfoxide, common polar aprotic solvents are acetone, n-pyrrolidone, acetonitrile and methyl cellosolve. These are all much more volatile, toxic and flammable than dimethyl sulfoxide. Therefore, their usefulness is limited for purposes of this invention.

Water up to about 10% can be tolerated in the silvering ink while still producing a bright silver coat on a copper substrate. At greater than 20% water, silver bromide begins to precipitates out of solution.

Immersion of copper in the presented waterless and electroless plating solution results in a one step process for plating copper with a bright silver metallic coating. The waterless solution is clear and stable in storage for over six months despite exposure to air and light. Also, the plating solution works well at room temperature.

Further the plating solution operates without need for an added reductant to produce elemental silver, as required in conventional electroless plating, and described, for example, in U.S. Pat. Nos. 63,875,442 and 5,322,553. Petitioner believes the silver diammine ion in the ink is self reducing on contact to the copper metal substrate.

Pen plating, immersion plating, and spray plating means for applying the silvering ink to a substrate have been found to have optimal silver concentrations for a bright silver plate. An ink solution for pen plating requires the most concentrated silver content due to its desired contact time of a few minutes. Immersion plating requires the least concentrated silver content as the liquid can contact the base metal for days. A process room temperature of about 25.deg.C. is a satisfactory environment. Higher process temperatures tend to quicken plate formation.

For plating a substrate through a pen nib, a preferable ink comprises 0.5 Molar as silver nitrate and 1 Molar as ammonium bromide in dimethyl sulfoxide. In a silvering solution for spray plating an article, 0.2M as silver nitrate and 0.4M as ammonium bromide in dimethyl sulfoxide comprises a preferable composition. For immersion plating an article, a preferable silvering composition comprises 0.1M as silver nitrate and 0.2 Molar as ammonium bromide in dimethyl sulfoxide.

While preferred embodiments of the present invention have been described, it should be understood that various changes, adaptations and modifications may be made therein without departing from the spirit of the invention and its claims.

I claim:

1. An electroless plating ink consisting of:
    a) a silver salt;
    b) an ammonium salt; and
    c) a polar aprotic solvent.
2. The plating ink of claim 1, wherein:
    a) the silver salt consists of silver nitrate
    b) the ammonium salt consists of ammonium bromide
    c) the polar aprotic solvent consists of dimethyl sulfoxide.
3. The plating ink of claim 1 wherein the polar aprotic solvent is not toxic.

* * * * *